(12) United States Patent
Wen

(10) Patent No.: US 7,784,376 B2
(45) Date of Patent: Aug. 31, 2010

(54) BICYCLE CABLE ASSEMBLY

(76) Inventor: Chun-Te Wen, P.O. Box 44-2049, Taipei (TW) 10668

( * ) Notice: Subject to any disclaimer, the term of this patent is extended or adjusted under 35 U.S.C. 154(b) by 446 days.

(21) Appl. No.: 11/898,665

(22) Filed: Sep. 14, 2007

(65) Prior Publication Data

US 2009/0071284 A1    Mar. 19, 2009

(51) Int. Cl.
*F16C 1/26* (2006.01)
(52) U.S. Cl. .................................... 74/502.5
(58) Field of Classification Search ........... 74/502.2; 59/78.1; 138/118, 120; 285/145.4, 223, 285/234
See application file for complete search history.

(56) References Cited

U.S. PATENT DOCUMENTS

| | | | | |
|---|---|---|---|---|
| 428,023 A | * | 5/1890 | Schoff | 138/120 |
| 4,396,797 A | * | 8/1983 | Sakuragi et al. | 174/68.3 |
| 5,143,123 A | * | 9/1992 | Richards et al. | 138/120 |
| 5,174,164 A | * | 12/1992 | Wilheim | 73/866.5 |
| 5,353,626 A | * | 10/1994 | Davidson et al. | 74/502.6 |
| 5,933,557 A | * | 8/1999 | Ott | 385/86 |
| 7,533,906 B2 | * | 5/2009 | Luettgen et al. | 285/146.1 |

* cited by examiner

Primary Examiner—Vicky A Johnson

(57) ABSTRACT

A bicycle cable assembly mainly includes an external protection tube composed of several hollow sleeves hooking together. Hooks and engaging edges of the sleeves hook together so that the external protection tube is formed and can be properly adjusted according to a length of a cable and a special position by increasing or decreasing the number of sleeves. Also, the hook hooking the engaging edge can prevent the external protection tube from being arbitrarily disassembled by others. Also, it is possible to effectively prevent an inner protection tube from exposing to the outside and thus being damaged. Thus, a protection layer can be indirectly added to the bicycle cable assembly.

6 Claims, 4 Drawing Sheets

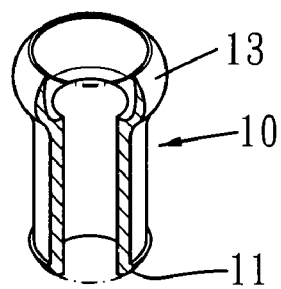
FIG. 2
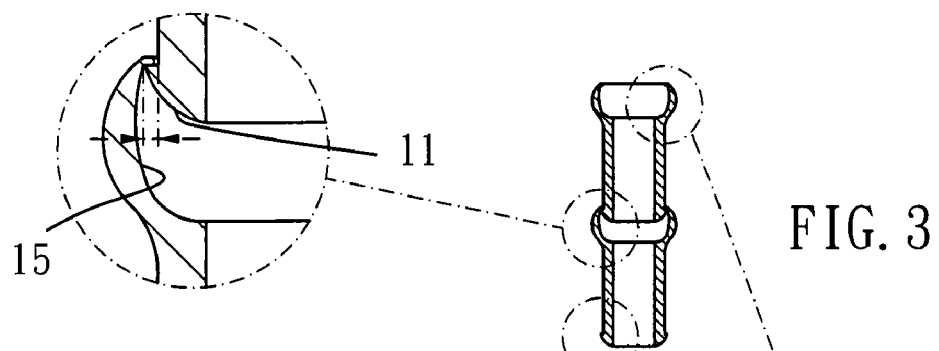
FIG. 3C
FIG. 3
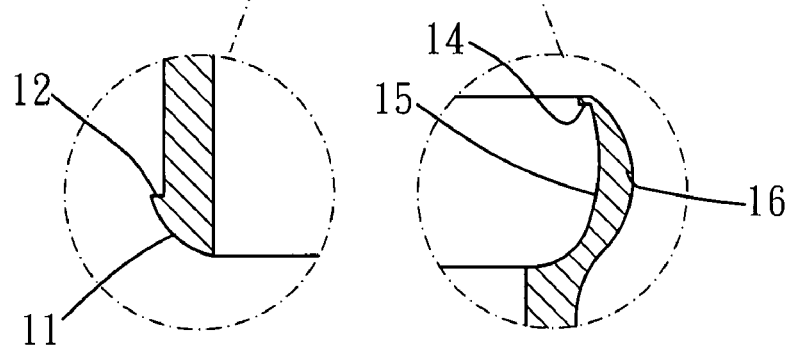
FIG. 3B  FIG. 3A

BICYCLE CABLE ASSEMBLY

BACKGROUND OF THE INVENTION (1) Field of the Invention

The invention relates to a cable assembly, and more particularly to a bicycle cable assembly.

(2) Description of the Prior Art

The exercise behavior is prevailing now, and riding a bicycle has become a good sport. Before riding the bicycle, the rider has to check whether the bicycle condition is good. As for the use of the bicycle cable assembly, such as that of a brake cable assembly or a shift cable assembly, the safety thereof becomes more important. Taking the brake cable assembly as an example, the conventional brake cable assembly for the bicycle brake system has some drawbacks.

First, the brake cable assembly includes an inner cable covered by a plastic cover. The plastic cover can prevent the water from entering the cable assembly to erode the cable. However, the plastic cover contacts the air and is exposed to the sun and the rain for a long period of time. Thus, the plastic cover losses its original elasticity due to the oxidation and the temperature variation and thus tends to chap and break, thereby exposing the inner cable to the outside.

Second, the plastic cover is not made of a material, which can withstand wear and scratch. So, the plastic cover may be cut by a contacting object having a tip end, and the inner cable tends to exposed to the outside.

Third, a plastic tube constituting the plastic cover has a fixed length, which is determined according to the inner cable. Once the length is determined, the length cannot be properly adjusted according to the special position. So, it is very inconvenient to the ordinary users.

Thus, the bicycle cable assembly still has to be improved. In view of this, it is an important problem, in which the plastic cover tends to be damaged and the inner cable tends to be exposed to the outside, to be solved now in the industry. Thus, a novel bicycle cable assembly of the invention will be described in the following.

SUMMARY OF THE INVENTION

It is therefore an object of the invention to provide a bicycle cable assembly having an external protection tube composed of sleeves, which are engaged together, so that the number of sleeves can be properly increased or decreased according to the length of the cable or the special position, and the prior art problem that a plastic tube cannot be properly adjusted can be solved.

Another object of the invention is to provide a bicycle cable assembly having an external protection tube composed of sleeves having a hook and an engaging edge engaging with each other so that the external protection tube cannot be arbitrarily disassembled by others. Also, it is possible to effectively prevent the inner protection tube from exposing to the outside and thus being damaged. Thus, a protection layer can be indirectly added to the bicycle cable assembly.

The invention provides a bicycle cable assembly mainly composed of several hollow sleeves hooking together. Each sleeve has a first opening end and a second opening end. The first opening end is formed with a continuous flange. The flange has a hook, which is formed at a maximum-diameter portion. The second opening end is formed with an outwardly expanded ring. The ring is formed with an engaging edge extending inwards. A diameter of the engaging edge of the ring is smaller than a maximum outer diameter of the flange. Thus, the first opening end of the first sleeve can be inserted into the second opening end of the second sleeve slantingly, the hollow sleeves are engaged together to form the external protection tube, and the hook and the engaging edge hook together.

Further aspects, objects, and desirable features of the invention will be better understood from the detailed description and drawings that follow in which various embodiments of the disclosed invention are illustrated by way of examples.

BRIEF DESCRIPTION OF THE DRAWINGS

FIG. 2 is a cross-sectional view showing a sleeve of the invention.

FIG. 3 is a cross-sectional view showing a connection between the sleeves of the invention.

FIG. 3A is a partially enlarged view showing a flange of the invention.

FIG. 3B is a partially enlarged view showing a ring of the invention.

FIG. 3C is an enlarged view showing the engagement between an engaging edge and a hook according to the invention.

DETAILED DESCRIPTION OF THE PREFERRED EMBODIMENTS

The invention relates to a bicycle cable assembly and will be described with reference to FIG. 1 first in order to achieve the above-mentioned objects, features, means and effects of the invention.

Figure 1:
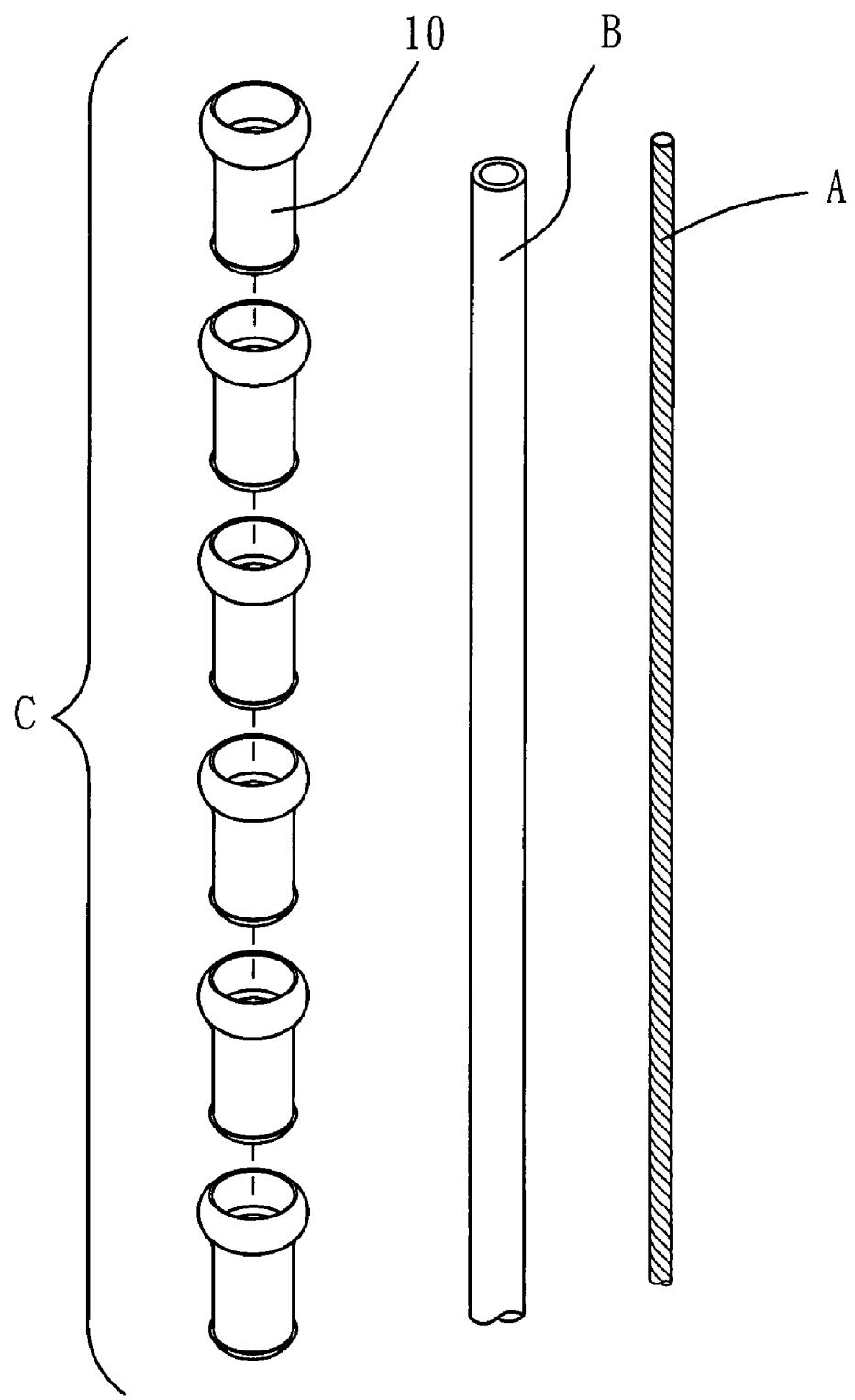
FIG. 1 is a decomposed schematic illustration showing the invention.

Referring to FIG. 1, the bicycle cable assembly according to an embodiment of the invention includes a brake cable A, an inner protection tube B and an external protection tube C. The brake cable A is made of a typical metal material. The inner protection tube B covers the brake cable A, and the inner protection tube B is composed of a plastic waterproof material. The inner protection tube B is inserted into the external protection tube C. The external protection tube C is composed of several hard and scratch-proof metallic hollow sleeves 10 hooking together. Next, as shown in FIGS. 2 and 3, each sleeve 10 includes a first opening end and a second opening end. As shown in FIG. 3A, the first opening end is formed with a continuous flange 11 around the opening of the sleeve. The flange 11 extends slantingly outwards from an inner edge of the sleeve 10 to form a maximum-diameter portion of the flange away from the opening. In addition, a hook 12 is formed at the maximum-diameter portion. As shown in FIG. 3B, the second opening end is formed with a ring 13 expanding outwards. The ring 13 can accommodate the flange 11. The ring includes an inner edge 15 and an outer edge 16, each of which has an outwardly expanded spherical shape. The ring 13 is formed with an engaging edge 14 extending inwards. The diameter of the engaging edge 14 of the ring 13 is smaller than the maximum outer diameter of the flange 11, as shown in FIG. 3C.

Figure 6:
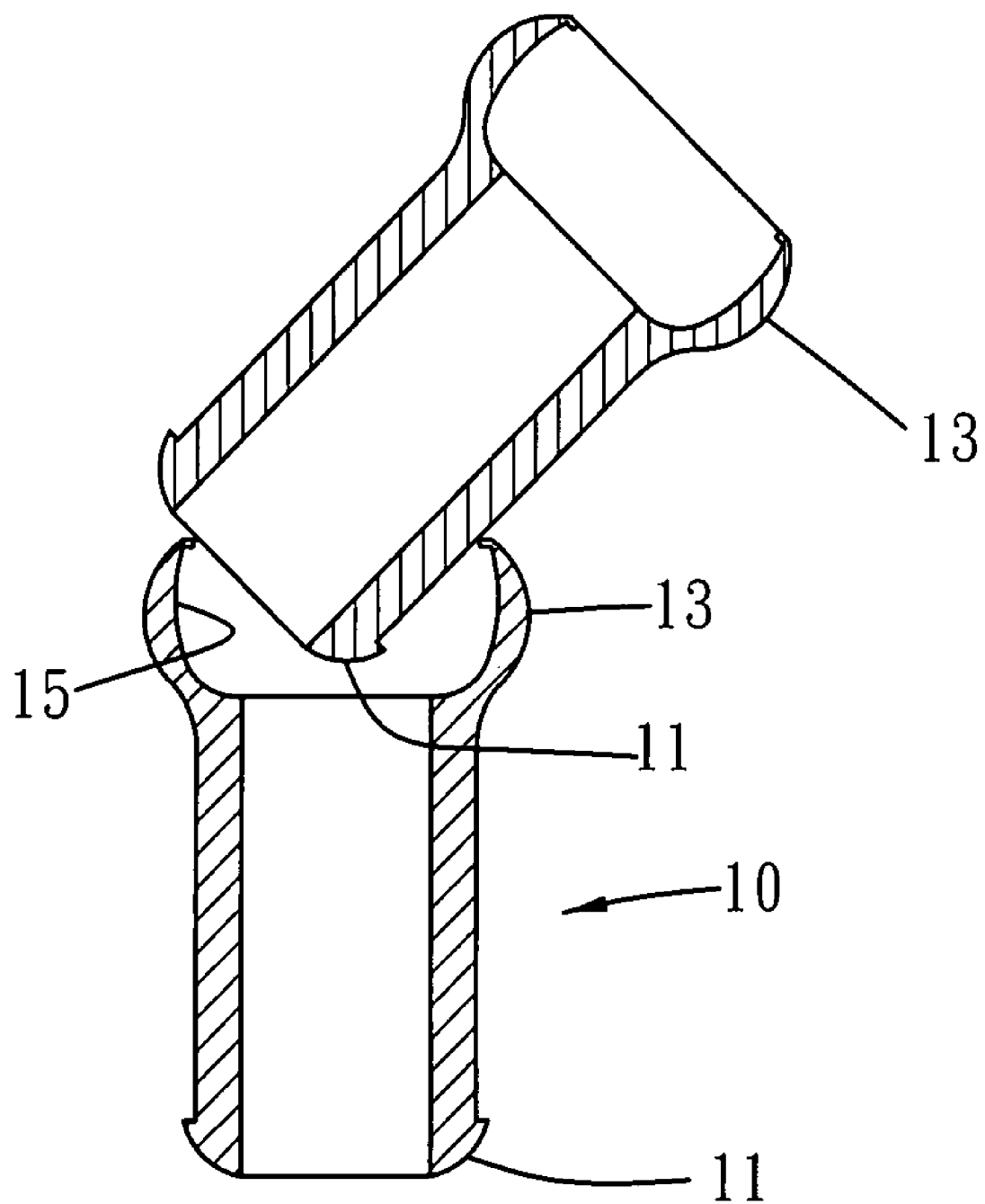
FIG. 6 is a schematic illustration showing operations of the invention.

In assembly, as shown in FIG. 6, the diameter of the engaging edge 14 of the ring 13 is smaller than the maximum outer diameter of the flange 11. So, the first opening end of the first sleeve has to be tilted by about 45 degrees and one side of the flange has to be first inserted into one side of the ring of the second sleeve. At this time, one portion of the flange has been inserted into the ring, so the other side of the flange can be smoothly inserted into the ring when the first sleeve becomes upright.

Figures 4, 5:
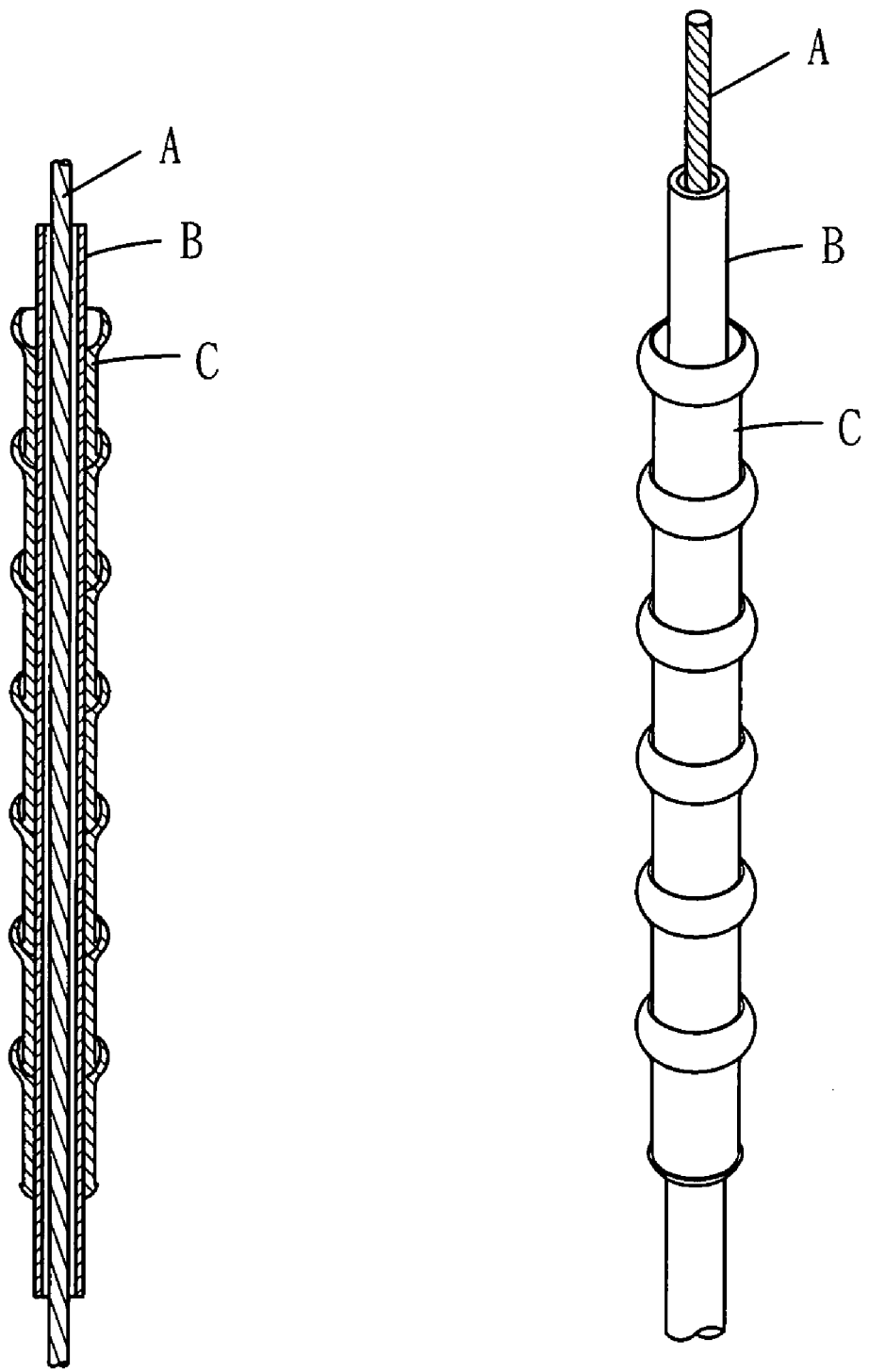
FIG. 4 is a cross-sectional view showing an overall structure of the invention.
FIG. 5 is an exterior schematic illustration showing the invention.

After other sleeves are assembled, the external protection tube can be formed, as shown in FIGS. 4 and 5. Because the sleeves hook together using the hook and the engaging edge, they can be connected together without any other object for connection when being used so that they can be used conveniently.

In detail, the length of the flange is smaller than ½ of the length of the ring in this embodiment. The advantage is that the flange can be inserted deeper inside the ring to prevent the hook from approaching the engaging edge, as shown in FIG. 4. If the hook approaches the engaging edge, the hook tends to escape from the engaging edge when the sleeves are bent.

Furthermore, the maximum outer diameter of the flange is smaller than ¾ of the maximum inner diameter of the ring in this embodiment. Such a design is to achieve the object of increasing the distance from the flange to the inner edge of the ring so that a larger bending angle between the sleeves can be obtained when the sleeves are used.

In summary, the invention can achieve the following features.

First, the flange of the sleeve is inserted into the ring of another sleeve in this invention so that the external protection tube is formed, and the external protection tube can be properly adjusted according to the lengths of different bicycle cable assemblies or special positions.

Second, the hook and the engaging edge can be engaged with each other in this invention so that the external protection tube cannot be arbitrary disassembled by others and it is possible to effectively prevent the inner protection tube from exposing to the outside and thus being damaged. Thus, a protection layer can be indirectly added to the bicycle cable assembly.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed. For example, the invention may be implemented as various bicycle cable assemblies, such as a brake cable assembly, a shift cable assembly or the like.

What is claimed is:

1. A bicycle cable assembly, mainly comprising a cable, an inner protection tube covering the cable, and an external protection tube covering the inner protection tube, wherein:
    the external protection tube is mainly composed of several hollow sleeves hooking together;
    the sleeves comprise a first sleeve and a second sleeve; each of the sleeves comprises a first opening end and a second opening end; the first opening end is formed with a continuous flange around an opening of the sleeve; the flange extends slantingly outwards from an inner edge of the sleeve to form a maximum-diameter portion of the flange away from the opening; a hook is formed at the maximum-diameter portion, the second opening end is formed with a ring expanding outwards; the ring is for accommodating the flange, the ring comprises an inner edge and an outer edge, each of which has an outwardly expanded spherical shape; the ring is formed with an engaging edge extending inwards, a diameter of the engaging edge of the ring is smaller than a maximum outer diameter of the flange; and
    the first opening end of the first sleeve can be inserted into the second opening end of the second sleeve slantingly, the hollow sleeves are engaged together to form the external protection tube, and the hook and the engaging edge hook together;
    wherein the maximum outer diameter of the flange is smaller than ¾ of a maximum inner diameter of the ring.

2. The bicycle cable assembly according to claim 1, wherein the sleeve is made of a metal material.

3. The bicycle cable assembly according to claim 1, wherein the inner protection tube is made of a plastic waterproof material.

4. The bicycle cable assembly according to claim 1, wherein a length of the flange is smaller than ½ of a length of the ring.

5. The bicycle cable assembly according to claim 1, wherein the cable is a brake cable.

6. The bicycle cable assembly according to claim 1, wherein the cable is a shift cable.

* * * * *